Feb. 7, 1967  W. L. MORRISON  3,302,425
FROZEN FOOD CONTAINER

Filed Nov. 24, 1965  2 Sheets-Sheet 1

INVENTOR
WILLARD L. MORRISON, DECEASED
BY LOIS M. MORRISON
PERSONAL REPRESENTATIVE

BY PARKER & CARTER
ATTORNEYS

Feb. 7, 1967     W. L. MORRISON     3,302,425
FROZEN FOOD CONTAINER
Filed Nov. 24, 1965     2 Sheets-Sheet 2
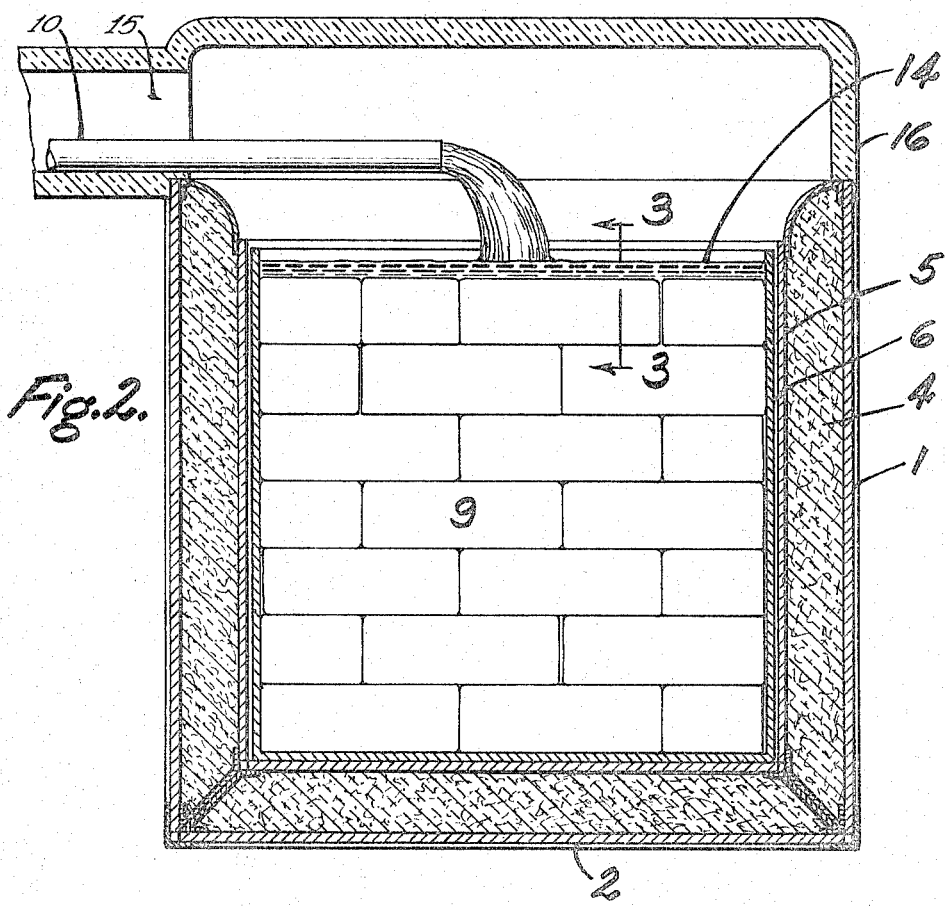
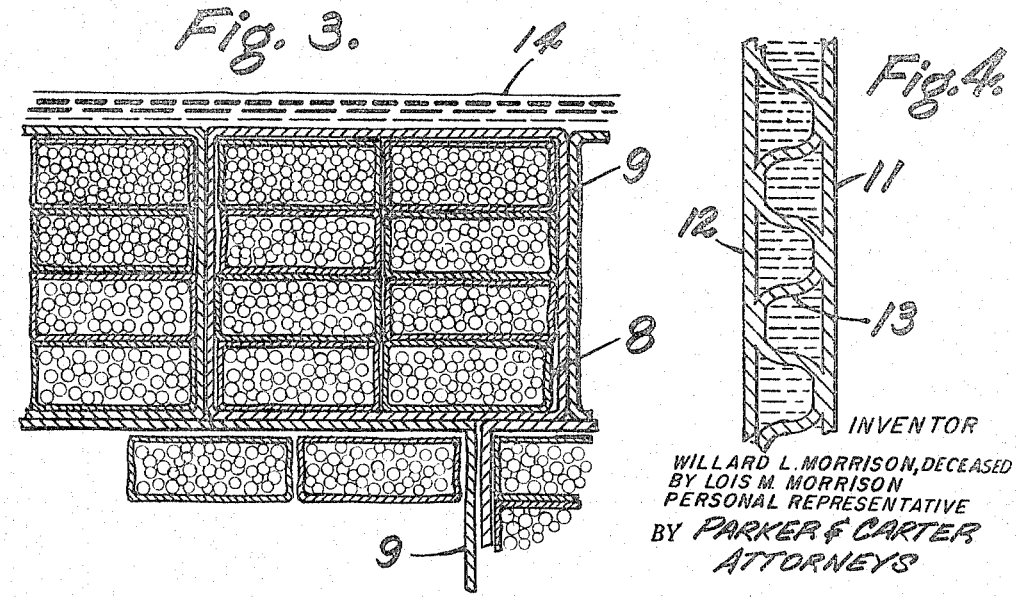
INVENTOR
WILLARD L. MORRISON, DECEASED
BY LOIS M. MORRISON
PERSONAL REPRESENTATIVE
BY PARKER & CARTER
ATTORNEYS

United States Patent Office 3,302,425
Patented Feb. 7, 1967

3,302,425
FROZEN FOOD CONTAINER
Willard L. Morrison, deceased, late of Lake Forest, Ill., by Lois M. Morrison, personal representative, 995 Northcliff, Lake Forest, Ill. 60045
Filed Nov. 24, 1965, Ser. No. 509,652
2 Claims. (Cl. 62—373)

This application is a continuation-in-part application of my co-pending application Serial No. 765,166, filed October 3, 1958, and Serial No. 284,286, filed May 17, 1963, both now abandoned.

My invention relates to an improvement in method of superchilling frozen food and the like and has for one object to lower the temperature of the food, for shipment in frozen condition, to such a point that it may be transported or shipped for long distances or held in storage for extended periods of time without the necessity of any subsequent cooling.

When masses of food are frozen in an insulated shipper container to temperatures far below zero degrees F., far below the temperatures to which the frozen foods are habitually in commerce reduced, such masses of food when left undisturbed and without subsequent refrigeration will remain for extended periods of time at temperatures below the danger point.

Frozen food should not while in storage and shipment be allowed to rise much, if any, above zero degrees F. Food is usually frozen in commerce to temperatures in the order of −10 to zero degrees F. and shipped and stored at that temperature under refrigeration.

What is here proposed is by immersion in a bath of liquid nitrogen at approximately −320 degrees F. at atmospheric pressure to reduce the temperature of the entire food mass many degrees, even hundreds of degrees or more below zero so that as the material remains in storage or is in transit in an insulated container, without additional refrigeration, the temperature rise between the time of initial superchilling and the time the container is opened at destination will be such that the temperature will still not be above the danger point. As soon as superchilling is completed and the container is closed heat inflow through the insulation commences to raise the temperature of the contents. In order that the temperature at destination or upon opening the container may be below the danger point, for example, zero degrees F., the starting temperature must be selected in consonance with the anticipated conditions and time of shipment and storage.

It is usually desirable that all of the food in the container be initially lowered to the desired minimum temperature, because if some elements are not adequately cooled, heat inflow may raise their temperature above the danger point.

Frozen food is usually packed in relatively small rectangular packages of smooth, lightweight material wrapped in thin, smooth decorative paper wrappers. The packages are sometimes frozen and sometimes unfrozen before they are packed for storage and shipment. Especially if the contents of these small packages is unfrozen, they must be protected against excessive pressure which might deform the package. Therefore, to protect the package against such pressure and also in order to protect the decorative wrappers, these packages are preferably tightly packed in cartons of porous, wick-like, liquid absorptive, perhaps corrugated board. A plurality of the cartons are then tightly packed in a container. This tight packing of the cartons in the container and of the packages in the carton is of the utmost importance to prevent damage to the carton and especially to prevent damage to the package and it is important in transit as frozen food packages are visually exposed for sale after removal from the carton and the appearance must be good or sales cannot be made.

The tightly packed container is then flooded with liquid nitrogen at a rate of supply more rapid than the rate of evaporation of the liquid and so the liquid nitrogen penetrates freely along the path provided for it by the liquid absorptive porous, wick-like walls of the carton and the spaces or voids defined by the porous walls of the carton. Thus liquid nitrogen is free to flow and be distributed about the entire mass of frozen or unfrozen food in the container.

The porous, liquid pervious and saturatable, wick-like walls of the carton provided connected vertical and horizontal flow paths along which the liquid may travel with relative freedom so that the liquid is distributed throughout the entire area. The capillary passages between the packages communicating as they do with the flow paths defined and provided by the carton walls provide, somewhat less open but nevertheless quite effective paths, for the liquid which reaches those capillary passages through the porous carton walls. Thus the liquid, as liquid, freely and easily penetrates rapidly into the mass and is distributed about the smooth package walls.

Liquid nitrogen is expensive. The quicker the liquid can penetrate into and travel about through the mass of food, the more effective is the chilling effect and the smaller the amount of liquid nitrogen necessary to produce a given desired temperature reduction. Time is also of the essence, the longer the time required to chill, the longer the delay in preparing the food for shipment.

When the desired amount of liquid nitrogen has been poured into the container, the liquid supply will be stopped and the container will be closed for storage and shipment. At that time the porous, absorptive wick-like walls of the carton will, being saturated with the liquid nitrogen, hold a substantial supply thereof and the capillary passages will also contain the liquid. The liquid nitrogen from the carton walls will continue to flow by capillary attraction into the spaces between the packages and will there, as in the carton walls, continue to evaporate with resultant cooling of the food packages. In order to permit such evaporation without damage to the container, the closed container will not be completely gas tight.

It will take an appreciable length of time for such evaporation to complete itself and during that time the temperature of the food in the food packages continue to fall.

The result of this is that after the commencement of the time of storage or shipment, there will be a continuous fall in temperature resulting from this evaporation and it will not be until the completion of the evaporation that heat inflow from outside can commence to raise the temperature of the food.

Other objects will appear from time to time throughout the specification and claims.

The invention is illustrated more or less diagrammatically in the accompanying drawings, wherein—

FIGURE 2 is a section through the container of FIGURE 1;

FIGURE 3 is a detail section on an enlarged scale along the line 3—3 of FIGURE 2 of a portion of the container and contents;

FIGURE 4 is a section on a further enlarged scale along the line 4—4 of FIGURE 3;

Like parts are indicated by like characters throughout the specification and drawings.

Figure 1:
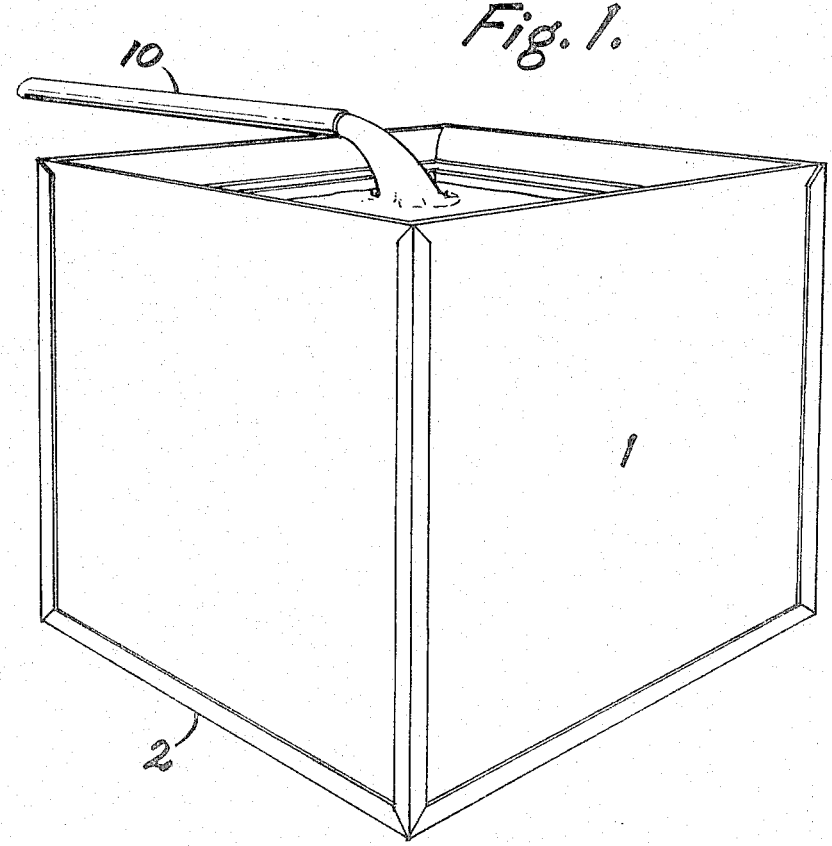
FIGURE 1 is a perspective view of a portable shipper container.
Figure 5:
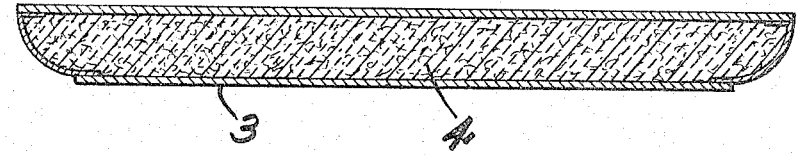
FIGURE 5 is a section through the removable cover.

The shipper container has side walls 1 and bottom 2, is open at the top and ultimately will be closed with an insulated cover 3. The walls, bottom and cover, are insulated at 4. Inner wall panels preferably of non-heat conductive material define an insulated storage chamber within the container and enclose a liquid tight liner 6 which closely fits the walls 5 and may be either removable or permanently installed.

In carrying out the process, individual, smooth walled food packages with decorative wrappers 8, having first been separately frozen as is common in the art, or if desired containing unfrozen food, will preferably while still frozen be tightly packed in pervious liquid absorbent cartons 9, for example of corruated box or paper board. These cartons will be tightly packed in the liquid tight liner 6. Then a continuous stream of liquid nitrogen or other suitable cold boiling liquid at atmospheric pressure will be poured through a discharge pipe diametrically shown at 10 into the container.

As the gas evaporates, it will be caught by the hood 16 and the gas will be withdrawn through the duct 15 for reliquefaction and reuse.

The liquid at substantially atmospheric pressure is at a temperature in the order of −320 degrees F., and as it comes in contact with the relatively warm zero degree contents of the container, the heat thereof will boil and evaporate the liquid. The rate of supply of the liquid will be so much more rapid than the rate of evaporation that the liquid will penetrate and saturate the cartons and fill the voids or reservoirs in the porous, wick-like carton walls. When the container is completely filled with the liquid, the liquid will have traveled along the path defined by the porous carton walls, fill the voids within the walls and about the packages and penetrated between the opposed surfaces of packages and cartons and the entire solid contents will be in such liquid to food contact that the entire mass will be reduced to the desired low temperature.

While it may under some circumstances be desirable to vary the rate of flow of liquid, flow of liquid will continue, maintaining a liquid bath completely filling the liner covering the solid contents and in contact with every part of the mass until the desired pre-planned low temperature is reached or approached, at which time flow will stop, the liquid will evaporate and the container will then be closed against the entrance of ambient air.

In FIGURE 4, I have illustrated a carton which may include plane, parallel walls 11, 12, joined by a corrugated sheet 13 defining passages along which the liquid can freely travel even before the walls themselves have been fully saturated. Any suitable type of carton may be used provided that the liquid saturates the carton, penetrates into the food packages themselves and the entire mass is immersed in the bath of liquid so that every part of the mass is exposed directly to a substantially continuous sheet of the liquid.

Since time is of the essence in the handling and shipping of frozen food, it is of the utmost importance that the food be chilled down to the desired minimum temperature just as fast as possible, it is equally important that no part of the food mass fails to be cooled to the desired low point. It has been suggested that food may be chilled by a spray of cold boiling liquid or by contact with the gas of a cold boiling liquid or other cold boiling gases. This may be satisfactory when individual small packages are to be frozen to temperatures in the order of −10 degrees F. but is altogether out of the question when large bodies of food must be frozen to temperatures many degrees, sometimes several hundred degrees below zero degrees F.

Men can handle small packages of frozen food at temperatures as low as −10 degrees F., but they can not handle large bodies of food frozen to temperatures one hundred or more degrees below zero and even if they could, it would be impractical because such masses of food when exposed as they would have to be to atmosphere far above their temperature, would be damaged by condensation and warmed above the desired starting temperature.

The pre-frozen food is packed in a shipper container in which it is to be shipped and stored and that while in that container is cooled to the desired low point. With the container filled with food packages, it is essential then that the liquid penetrate throughout the mass and wet the surface of every food package. This cannot be assured by the use of sprays, or by the use of gas. Only when the container is completely filled with the bath of the liquid so that that bath has saturated the entire mass of food and every surface of every package has been wet with the liquid, then and then only can we be sure that every part of the mass is reduced to the desired low temperature. When the flood of liquid is poured into the container and fills it with the liquid bath, and that bath is continuously replenished so that the container remains full with solid contents covered until the desired low temperature has been reached, then can we be sure that every particle of the food is at the desired low temperature.

If the wrappers of the individual food particles are liquid-proof—they usually are not—then the liquid of the bath will wet every side of the package without penetrating the package itself and the package is so small that no harm is done. However, as is usually the case, the wrapper is not liquid-proof and there will be actual penetration of the liquid nitrogen into the inside of the package and such penetration is desirable rather than undesirable.

The details of the means for supplying the liquid and for reliquefying the gas for reuse to form and maintain the bath have not been illustrated as the details form no part of the present invention. The liquid will pour in a solid stream or streams into the container. As the liquid evaporates, the evolved gas will be drawn off, reliquefied and reused. As far as the present invention is concerned, it makes no difference where or how the liquid is distributed as it arrives at the container, provided a bath, the level of which is shown at 14, is formed which fills the container and covers the entire food mass.

The bath liquid in contact with the food packages boils violently and the gas resulting is immediately discharged through the body of the bath. The body of the bath at atmospheric pressure is approximately −320 degrees F. The gas boils off at that temperature and that gas as it passes out remains very close to, if not exactly at the boiling temperature, only the latent heat of evaporation being used to chill the food. This is an important advantage because the gas at boiling temperature can be easily reliquefied with a minimum of expense and since heat exchange with the gas is not relied upon to cool the food, the food being cooled by contact with the liquid itself, much more effective refrigeration results than would result if sprays or gas or gas heat exchange were relied upon.

The K factor or rate of heat flow through the walls of the insulated container is known. An operator will know in advance how long the food is to be maintained at a temperature below zero degrees F. He will know generally the thermal conditions to which the container will be exposed during the predetermined length of time. He knows at time of opening the temperature of the contents should not be above zero degrees F. He is thus able to determine the temperature below zero degrees F. to which the material must be cooled in order that at destination it will still be below zero degrees F.

The weight, temperature and specific heat of the food in the container will be known. From this, having determined the minimum temperature, the user easily calculates the number of B.t.u.'s which must be extracted from the food to lower it to that desired temperature. The number of B.t.u.'s necessary to vaporize liquid nitrogen at atmospheric pressure is known. From this the operator can easily calculate the number of liters of nitrogen which must be poured into the container to, as a result of the vaporization of the nitrogen, extract the number of B.t.u.'s from the food necessary to bring the temperature down to the desired point.

As the nitrogen is poured in and evaporates the time will come when having poured in the necessary amount, the operator can then close the container, turn off the supply of nitrogen knowing that the liquid has penetrated along the easy flow paths defined by the porous or corrugated carton walls throughout the entire body of food in the container and when the supply stops and the container is closed, it will still have in it a substantial reservoir of liquid nitrogen saturating the carton walls and filling the apertures or pockets in the carton walls so that such liquid will flow from the carton walls through the capillary spaces between the packages perpendicular to and terminating in the carton walls to insure general distribution of the liquid nitrogen and effective chilling of the entire mass by the liquid.

The porous, wick-like carton walls as well as furnishing a path for easy flow of liquid throughout the mass also to a very important extent furnish a reservoir to hold the liquid nitrogen after the desired amount has been fed in and the container is closed. This makes it possible to ship or store with the food, the exact amount of liquid nitrogen necessary to achieve the desired result and to insure that this nitrogen will automatically be brought in contact with the food in liquid phase so that the heat extracted from the food must first vaporize the gas before any rise in temperature may occur and the fact that the fall in temperature of the food as a result of the vaporizing or boiling of the liquid continues for a long time after the liquid supply has stopped, is of the utmost importance in preserving and protecting the food against heat infiltration. In effect, the result, of course, is to substantially delay the time at which heat inflow commences to raise the food temperature.

It is highly desirable to start with packages of food as nearly at uniform temperature as possible. To do this, it is desirable to remove as nearly as possible the same amount of heat from every package. That points up the importance of the free flow path of liquid through the carton walls and the capillary flow path of liquid from the free flow path between the packages.

If it should happen that some of the packages would be lowered to −320 degrees F. and others remain at zero degrees F., the temperature differential between −320 degrees F. cases probably on the outer boundaries of the mass and the insulation would result in a much greater rise in temperature. Therefore, it is desirable if for example we decide to lower the mass to −80 degrees F. to as near as possible lower all the packages to −80 degrees F. by wetting all the surfaces throughout the closely packed carton. The arrangement disclosed approaches that desirable situation.

I claim:
1. In combination,
  a shipping container,
  said shipping container having top, side and bottom walls which include an insulating material to thereby minimize the rate of heat flow therethrough,
  liner means disposed within the zone formed by the walls of the shipping container,
  said liner means having bottom and side walls connected one to another to form a liquid tight receptacle,
  a plurality of cartons disposed within the liner means,
  each of said cartons containing at least one package of frozen foodstuffs,
  said cartons being arranged in packed, abutting engagement with one another,
  the walls of each of said cartons being composed of a porous, wick-like material which is capable of transmitting a cold, liquid refrigerant in contact with the carton at one location to another location,
  said walls thereby providing a combined reservoir and first refrigerant flow path for liquid refrigerant in contact with said cartons,
  said cartons forming passages capable of transmitting a cold liquid refrigerant located therein from a first location to a second location by capillary action in areas where said cartons abut one another,
  said capillary passages thereby providing a combined reservoir and second refrigerant flow path for liquid refrigerant in contact with said cartons,
  the package or packages within each carton including wrapper means which enable the contents of the package to be exposed to the effect of the refrigerant which reaches the wrapper, and
  a quantity of refrigerant within the liner means, at least a portion of which refrigerant is initially in a liquid condition and contained in the first and second reservoir means formed, respectively, by the carton walls and the capillary passages formed between adjacent, abutting cartons.

2. The structure of claim 1 further characterized in that the refrigerant is nitrogen.

References Cited by the Examiner
UNITED STATES PATENTS
2,948,123   8/1960   Morrison _____ 62—64

EDWARD J. MICHAEL, *Primary Examiner.*